US009904300B2

(12) United States Patent
Ito et al.

(10) Patent No.: US 9,904,300 B2
(45) Date of Patent: Feb. 27, 2018

(54) LIQUID TRANSPORT APPARATUS

(71) Applicant: I'MSEP CO., LTD., Kyoto (JP)

(72) Inventors: Yasuhiko Ito, Kyoto (JP); Tokujiro Nishikiori, Osaka (JP); Hiroyuki Watanabe, Gifu (JP)

(73) Assignee: I'MSEP CO., LTD., Kyoto (JP)

( * ) Notice: Subject to any disclaimer, the term of this patent is extended or adjusted under 35 U.S.C. 154(b) by 557 days.

(21) Appl. No.: 14/402,993

(22) PCT Filed: Sep. 27, 2013

(86) PCT No.: PCT/JP2013/076305
§ 371 (c)(1),
(2) Date: Nov. 21, 2014

(87) PCT Pub. No.: WO2014/051070
PCT Pub. Date: Apr. 3, 2014

(65) Prior Publication Data
US 2015/0153745 A1 Jun. 4, 2015

(30) Foreign Application Priority Data

Sep. 27, 2012 (JP) ................. 2012-213366

(51) Int. Cl.
*G05D 9/00* (2006.01)
*C25C 5/04* (2006.01)
(Continued)

(52) U.S. Cl.
CPC ................. *G05D 9/00* (2013.01); *C25C 5/04* (2013.01); *C25C 7/005* (2013.01); *F04D 1/14* (2013.01);
(Continued)

(58) Field of Classification Search
CPC .... F04D 1/14; F04D 7/06; G05D 9/00; C25C 5/04; C25C 7/005; Y10T 137/6416; Y10T 137/7287
See application file for complete search history.

(56) References Cited

U.S. PATENT DOCUMENTS 3,100,027 A 8/1963 Harris et al.
4,143,999 A 3/1979 Ryall
(Continued)

FOREIGN PATENT DOCUMENTS

JP 50-156810 12/1975
JP 55-51120 4/1980
(Continued)

OTHER PUBLICATIONS

International Search Report, dated Jan. 7, 2014.

*Primary Examiner* — Ciel P Thomas
(74) *Attorney, Agent, or Firm* — Greenblum & Bernstein, P.L.C.

(57) ABSTRACT

A liquid transport apparatus includes: a U-shaped vessel for storing the liquid; an inverse conically shaped body which is hollow and has an opening part of an upper end and an opening part of a lower end; and a rotating disk driving motor part for rotating the inverse conically shaped body on an axis extending along a substantially vertical direction. The opening part of the lower end of the inverse conically shaped body is immersed in the liquid stored in the U-shaped vessel. In the liquid transport apparatus, an overflow opening part for keeping constant a distance between the opening part of the lower end of the inverse conically shaped body and a surface of the liquid stored in the U-shaped vessel is formed.

5 Claims, 9 Drawing Sheets

(51) Int. Cl.
*C25C 7/00* (2006.01)
*F04D 1/14* (2006.01)
*F04D 7/06* (2006.01)

(52) U.S. Cl.
CPC .......... *F04D 7/06* (2013.01); *Y10T 137/6416* (2015.04); *Y10T 137/7287* (2015.04)

(56) References Cited

U.S. PATENT DOCUMENTS

| | | | | |
|---|---|---|---|---|
| 5,298,167 A | * | 3/1994 | Arnold | B01D 17/0208 |
| | | | | 210/703 |
| 5,399,829 A | * | 3/1995 | Ogilvie | B01J 19/088 |
| | | | | 219/121.36 |
| 2004/0064292 A1 | * | 4/2004 | Beck | E21B 43/126 |
| | | | | 702/182 |
| 2007/0110560 A1 | | 5/2007 | Clement | |

FOREIGN PATENT DOCUMENTS

| | | |
|---|---|---|
| JP | 62-237096 | 10/1987 |
| JP | 2008-261609 | 10/2008 |

* cited by examiner

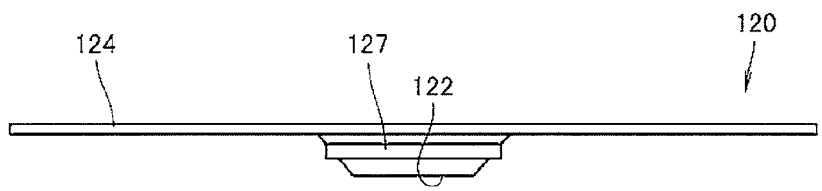
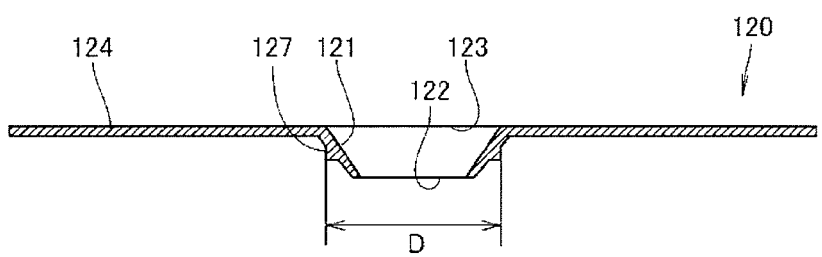
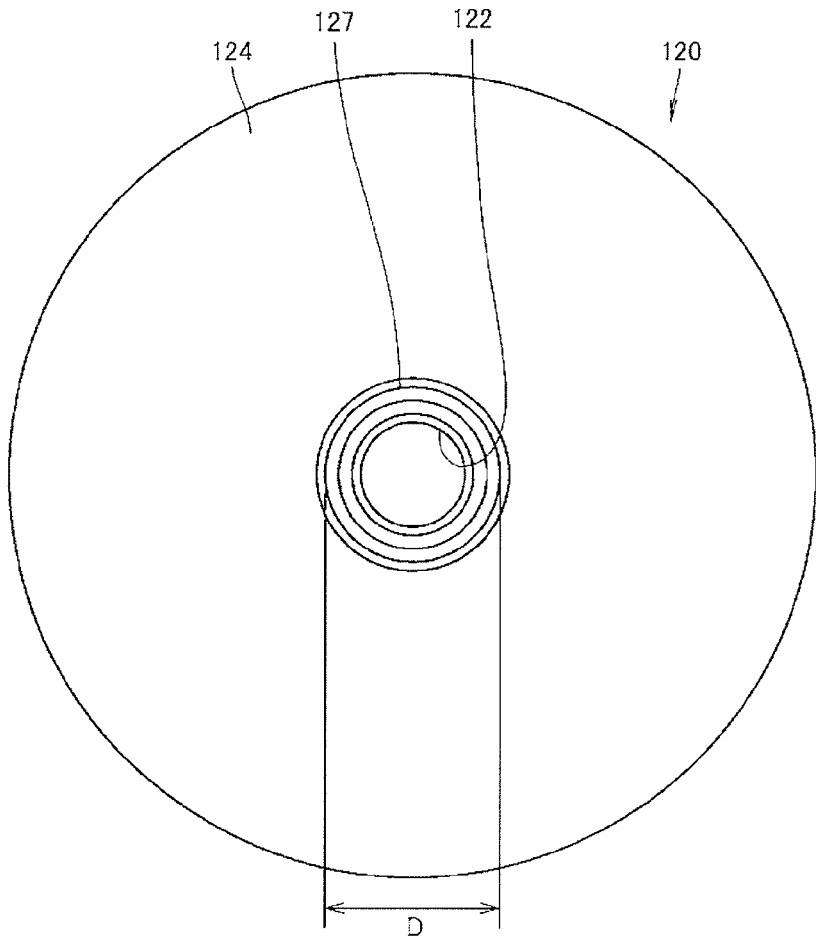

LIQUID TRANSPORT APPARATUS

TECHNICAL FIELD

The present invention relates generally to a liquid transport apparatus and more particularly, to a liquid transport apparatus for transporting a liquid by centrifugal force.

BACKGROUND ART

Conventionally, there has been proposed an apparatus for sucking up and spraying a liquid by utilizing a phenomenon in which a lower portion of an impeller or a rotor is immersed in the liquid and the impeller or the rotor is rotated, whereby the liquid rises up on a surface of a peripheral wall of the impeller or the rotor.

For example, in Japanese Utility Model Application Laid-Open Publication No. S50-156810 (Patent Literature 1), disclosed is a centrifugal-force-type liquid spraying apparatus in which a liquid is sucked up from a liquid suction pipe through the rotation of an impeller and is sprayed against an impact body, thereby pulverizing sprayed liquid particles. This liquid spraying apparatus is equipped with: the impeller which includes a liquid passage formed by overlapping two rotating plates and a fan provided on at least one of these rotating plates; and the liquid suction pipe provided in the central portion of said impeller so as to communicate with the liquid passage. Upon supplying power to a motor and driving the impeller and the liquid suction pipe, water inside a water tank rises along an inner wall of the liquid suction pipe and flows from a water passing hole into the liquid passage of the impeller. The water flowing into said liquid passage is accelerated by centrifugal force and scattered outwardly.

In addition, in Japanese Patent Application Laid-Open Publication No. 2008-261609 (Patent Literature 2), disclosed is a mist generation apparatus which includes a rotor capable of scattering a liquid around by centrifugal force. As one embodiment of this mist generation apparatus, the mist generation apparatus in which a hole part is formed inside an axial part of the rotor is disclosed. In this embodiment, it is disclosed that when the rotor is rotated, water located inside the hole part of the axial part rises in a manner of film along an inner peripheral surface of the hole part by the action of centrifugal force, reaches an upper surface of a rotating plate, is subsequently accelerated on the upper surface of the rotating plate by the centrifugal force and thereby becomes water-film, and is scattered toward around the rotating plate.

CITATION LIST

Patent Literature

Patent Literature 1: Japanese Utility Model Application Laid-Open Publication No. S50-156810
Patent Literature 2: Japanese Patent Application Laid-Open Publication No. 2008-261609

SUMMARY OF THE INVENTION

Technical Problem

However, an object of the liquid spraying apparatus disclosed in Patent Literature 1 is to sufficiently accelerate the liquid by the impeller in order to make particles of the sprayed liquid small, but keeping an amount of the sprayed liquid constant is not considered. In addition, first, in order to generate a negative pressure inside the liquid suction pipe by rotating the impeller and suck up the liquid up to the liquid passage, and further in order to accelerate the liquid flowing into the liquid passage of the upper surface of the rotating plate by the centrifugal force and scatter the liquid outwardly, an impeller capable of generating the negative pressure inside the liquid suction pipe is required, thereby making the apparatus complicated and large-sized.

Also objects of the mist generation apparatus disclosed in Patent Literature 2 are to make a particle diameter of the mist small and to generate a lot of mist, but making an amount of the sprayed liquid constant is not considered.

Therefore, an object of the present invention is to provide a liquid transport apparatus which utilizes centrifugal force, has a simple configuration, and is capable of pumping up and transporting a liquid at a constant rate.

Solution to Problem

A liquid transport apparatus according to the present invention includes: a vessel for storing a liquid; an inverse conically shaped body being hollow and having opening parts on an upper end and a lower end of the inverse conically shaped body; and a driving source for rotating the inverse conically shaped body on an axis extending along a substantially vertical direction. The opening part of the lower end of the inverse conically shaped body is positioned so as to be immersed in the liquid stored in the vessel. The liquid transport apparatus further includes distance adjusting means for keeping constant a distance between the opening part on the lower end of the inverse conically shaped body and a surface of the liquid stored in the vessel. The distance adjusting means includes liquid level adjusting means. The liquid level adjusting means is to keep constant a liquid level in the vessel even when the liquid is pumped up from the vessel by the inverse conically shaped body and includes: a liquid reservoir tank for storing the liquid passing through an opening part of the vessel and drained from an inside of the vessel; and liquid circulation means for returning the liquid inside the liquid reservoir tank to the vessel.

The present inventors, et al. found that by keeping constant the distance between the lower end opening part of the inverse conically shaped body and the surface of the liquid stored in the vessel, the liquid can be pumped up and transported at a constant rate by centrifugal force. In addition, the present inventors, et al. found that by doing this as described above, by rotational frequency of the inverse conically shaped body, a depth in which the lower end of the opening part is immersed, an inclination angle between a slope of the inverse conically shaped body and a horizontal plane, and a diameter of the lower end opening part, an amount of the liquid transported from the lower end of the inverse conically shaped body up to the upper end thereof can be controlled.

In the liquid transport apparatus according to the present invention, it is preferable that the liquid level adjusting means includes a draining outlet formed in the vessel to drain an amount of the liquid which exceeds an amount allowing the level of the liquid stored inside the vessel to be at a predetermined height.

In the liquid transport apparatus according to the present invention, it is preferable that the distance adjusting means for adjusting the distance between the lower end opening part of the inverse conically shaped body and the surface of the liquid stored in the vessel includes height adjusting means for adjusting a relative position of the inverse conically shaped body with respect to the surface of the liquid stored in the vessel so as to allow the distance between the opening part of the lower end of the inverse conically shaped body and the surface of the liquid stored in the vessel to be kept constant.

It is preferable that the liquid transport apparatus according to the present invention includes a heating part for heating the liquid stored in the vessel.

In the liquid transport apparatus according to the present invention, it is preferable that on an outer peripheral surface of the inverse conically shaped body, a protrusion extending along a direction of a diameter of the inverse conically shaped body is formed and the protrusion is positioned above the surface of the liquid stored in the vessel.

In the liquid transport apparatus according to the present invention, it is preferable that the inverse conically shaped body includes a lower side brim part extending from the opening part of the lower end toward an inside of the inverse conically shaped body in a substantially horizontal direction.

In the liquid transport apparatus according to the present invention, it is preferable that a liquid stored in the vessel is molten salt. Although there may be an embodiment in which a cathode and an anode are included in the molten salt stored in the vessel, it is preferable that a cathode being positioned above the molten salt in the vicinity of a surface of the molten salt stored in the vessel and around the opening part of the lower end of the inverse conically shaped body is included.

Thus, a liquid transport apparatus which utilizes centrifugal force generated in a liquid through the rotation of the inverse conically shaped body, has a simple configuration, and is capable of transporting an electrolytically formed substance such as metal particles formed in the molten salt together with the molten salt at a constant rate.

Advantageous Effects of the Invention

As described above, according to the present invention, a liquid transport apparatus which utilizes centrifugal force generated in a liquid by the rotation of an inverse conically shaped body, has a simple configuration, and is capable of pumping up and transporting the liquid can be provided.

BRIEF DESCRIPTION OF THE DRAWINGS

FIG. 3A is a front view, FIG. 3B is a cross-sectional view, and FIG. 3C is a bottom view, each illustrating the whole of a rotating disk in the liquid transport apparatus according to the one embodiment of the present invention.

DESCRIPTION OF EMBODIMENTS

Hereinafter, embodiments of the present invention will be described with reference to the accompanying drawings.

(First Embodiment)

Figure 1:
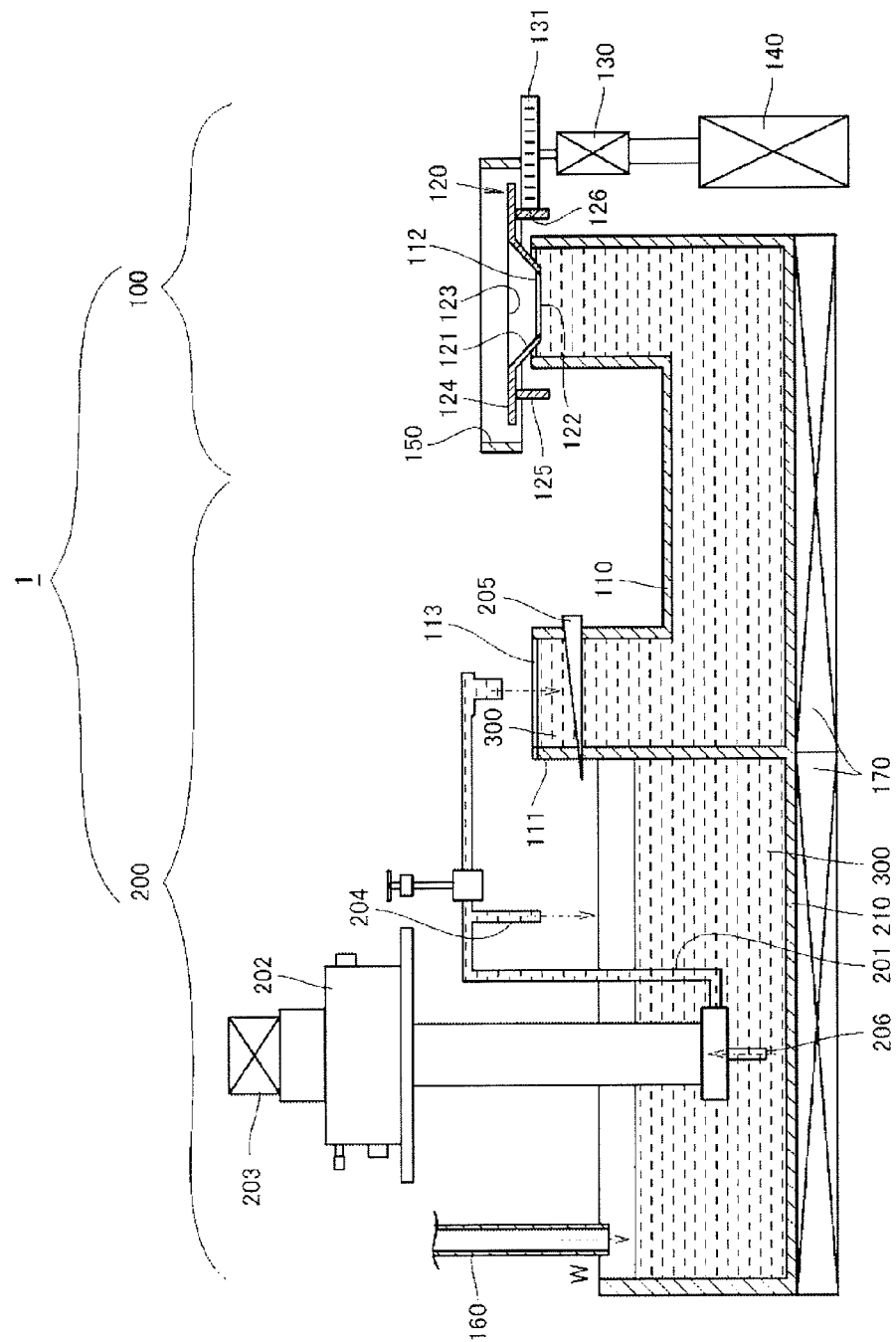
FIG. 1 is a diagram schematically illustrating the whole of a liquid transport apparatus according to one embodiment of the present invention.

As shown in FIG. 1, as one embodiment of the present invention, a liquid transport apparatus 1 is roughly divided into and constituted of a liquid transporter 100 and a liquid circuit 200.

The liquid transporter 100 is mainly constituted of: a U-shaped vessel 110; a heating and heat-retaining part 170 including a heater for heating and heat-retaining the U-shaped vessel 110 and a heat insulating material; a rotating disk 120 for pumping up and transporting a liquid 300 inside the U-shaped vessel 110 to an outside of the U-shaped vessel 110; a rotating disk driving motor part 130 for driving the rotating disk 120; an elevator mechanism 140 for the rotating disk 120; and a collecting wall 150.

The liquid circuit 200 is mainly constituted of: a liquid reservoir tank 210; a heating and heat-retaining part 170 for heating and heat-retaining the liquid reservoir tank 210; a supply part 160 for supplying the liquid 300 into the liquid reservoir tank 210; the later-described liquid circuit passage 201; a pump 202; a circulation motor 203; and the like.

The rotating disk 120 has an inverse conically shaped body 121 formed so as to be of an inverse conical shape. Upper and lower ends of the inverse conically shaped body 121 are opened. On an opening part 122 of the lower end, a lower brim part (not shown) which extends toward an inside of the rotating disk 120 into a substantially horizontal plane and is of a circular plate shape is formed. The opening part 122 of the lower end is immersed in the liquid 300 inside the U-shaped vessel 110. On an opening part 123 of the upper end, an upper brim part 124 which extends toward an outside of the rotating disk 120 into a substantially horizontal plane and is of a circular plate shape is formed. On an outside of the periphery of the upper brim part 124 of the rotating disk 120, a collecting wall 150 is formed.

On a lower surface of the upper brim part 124, a supporting part 125 which extends vertically downward is attached, and on an outer peripheral surface of the supporting part 125, a gear part 126 is formed. The supporting part 125 is formed so as to cover the whole circumferential direction around the inverse conically shaped body 121 of the rotating disk 120 and to be of a ring shape. A gear of the gear part 126 engages with a gear 131 of the rotating disk driving motor part 130. The rotating disk 120, the rotating disk driving motor part 130, and the collecting wall 150 are supported from below so as to simultaneously move in a vertical direction by the elevator mechanism 140 as one example of distance adjusting means for adjusting a distance between the rotating disk and a liquid surface.

The U-shaped vessel 110 for storing the liquid 300 is formed of, for example, quartz and formed so as to be of a substantially U-shape, and opening parts are formed on two respective ends thereof. An opening part 112 on one end is positioned below the rotating disk 120. An opening part 113 on the other end is opened above the liquid reservoir tank 210 in the vicinity of the liquid reservoir tank 210 constituting the liquid circuit 200. On the opening part 113, an overflow opening part 111 is formed. The overflow opening part 111 is formed, for example, as a cutout which is formed at an end portion of the opening part of the U-shaped vessel 110. In addition, the overflow opening part 111 may be formed as a hole which penetrates through a wall surface of the U-shaped vessel 110. The overflow opening part 111 is formed in the U-shaped vessel 110 to discharge an amount of the liquid 300 which exceeds an amount allowing a level of the liquid 300 stored inside the U-shaped vessel 110 to be at a predetermined height.

The periphery of the U-shaped vessel 110 and the liquid reservoir tank 210 are covered by the heating and heat-retaining part 170 in accordance with the necessity. In FIG. 1, only the heating and heat-retaining part 170 positioned on bottom surfaces of the U-shaped vessel 110 and the liquid reservoir tank 210 is shown. The heating and heat-retaining part 170 is positioned not only on the bottom parts of the U-shaped vessel 110 and the liquid reservoir tank 210 but also on the whole of outer peripheral surfaces of the U-shaped vessel 110 and the liquid reservoir tank 210, though it is not shown. It is to be noted that if it is not needed to heat a liquid pumped up and transported by the liquid transport apparatus 1, it is not necessary to provide the heating and heat-retaining part 170.

Above the liquid reservoir tank 210, a supply part 160 is positioned. The supply part 160 is to supply the liquid 300 into the liquid reservoir tank 210.

Inside the liquid reservoir tank 210, a liquid circuit passage 201 for circulating the liquid 300 is installed. The liquid circuit passage 201 forms a flow passage which sucks the liquid from a liquid suction port 206 located in a lower portion of the liquid reservoir tank 210 and supplies the liquid to the opening part 113 of the U-shaped vessel 110. In the liquid circuit passage 201, between the liquid suction port 206 and the opening part 113 of the U-shaped vessel 110, a pump 202 for circulating the liquid 300, a circulation motor 203 for driving the pump 202, and in accordance with the necessity, a bypass 204 are positioned. It is preferable that in the U-shaped vessel 110, a rectifier 205 for guiding the liquid to the reservoir tank in a case where overflow occurs from an undesirable place is positioned.

Figure 2:
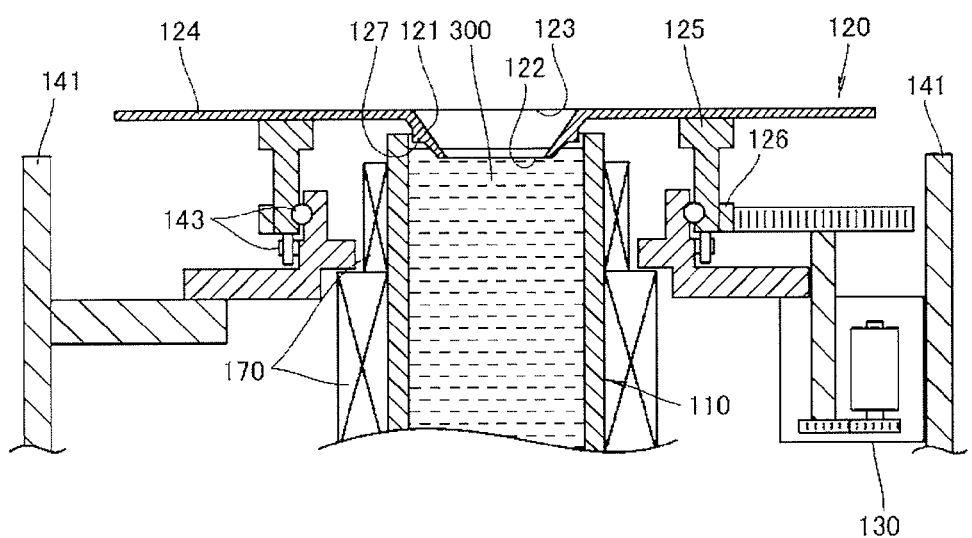
FIG. 2 is a diagram partially and schematically illustrating a liquid transporter in the one embodiment of the present invention.

As shown in FIG. 2, the rotating disk driving motor part 130 is supported by a slide rail 141 of the elevator mechanism 140 (FIG. 1). The rotating disk driving motor part 130 is configured so as to be capable of ascending and descending along the slide rail 141. The rotating disk driving motor part 130 is caused to ascend and descend along the slide rail 141 such that the opening part 122 of the lower end of the rotating disk 120 is immersed in the liquid 300 inside the U-shaped vessel 110, thereby adjusting a position of the rotating disk 120.

The elevator mechanism 140 including the slide rail 141 is one example of means for adjusting a height of the rotating disk 120. As a mechanism for ascending and descending the rotating disk driving motor part 130, other heretofore known mechanism can be used. A lower portion of an inner peripheral surface of the supporting part 125 and a lower surface of the supporting part 125 are respectively attached to the slide rail 141 via a bearing 143.

As shown in FIG. 3, on an outer peripheral surface of the inverse conically shaped body 121 of the rotating disk 120, a protrusion 127 is formed. The protrusion 127 is formed, for example, to be flat-plate-like and has a brim which extends in a direction along a diameter of the inverse conically shaped body 121 and a wall surface which extends so as to contact the outer peripheral surface of the inverse conically shaped body in a substantially vertical direction from an edge portion of an outer periphery. It is preferable that the protrusion 127 formed on the outer peripheral surface of the inverse conically shaped body 121 is formed as one protrusion which extends over the whole of a circumferential direction of the outer peripheral surface of the inverse conically shaped body 121. However, the protrusion 127 is not necessarily required to be flat-plate-like and may be formed to be, for example, step-like. In addition, as the protrusion 127, for example, a multiple protrusions which are flat-plate-ring-like may be positioned at different heights. The protrusion 127 is positioned above a surface of the liquid 300 (FIG. 2). An outer diameter D of the protrusion 127 is smaller than an inner diameter of the opening part 112 on a side on which the rotating disk 120 of the U-shaped vessel 110 is positioned.

Figure 4:
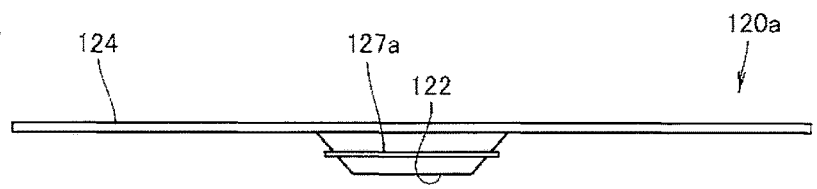
FIG. 4A is a front view.
FIG. 4B is a cross-sectional view.
FIG. 4C is a bottom view, each illustrating the whole of a rotating disk of another example in the liquid transport apparatus according to the one embodiment of the present invention.
Figure 4:
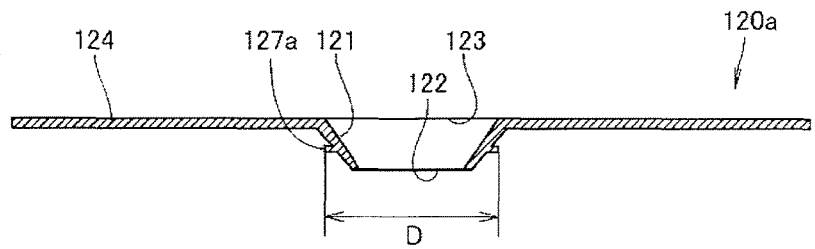
Figure 4:
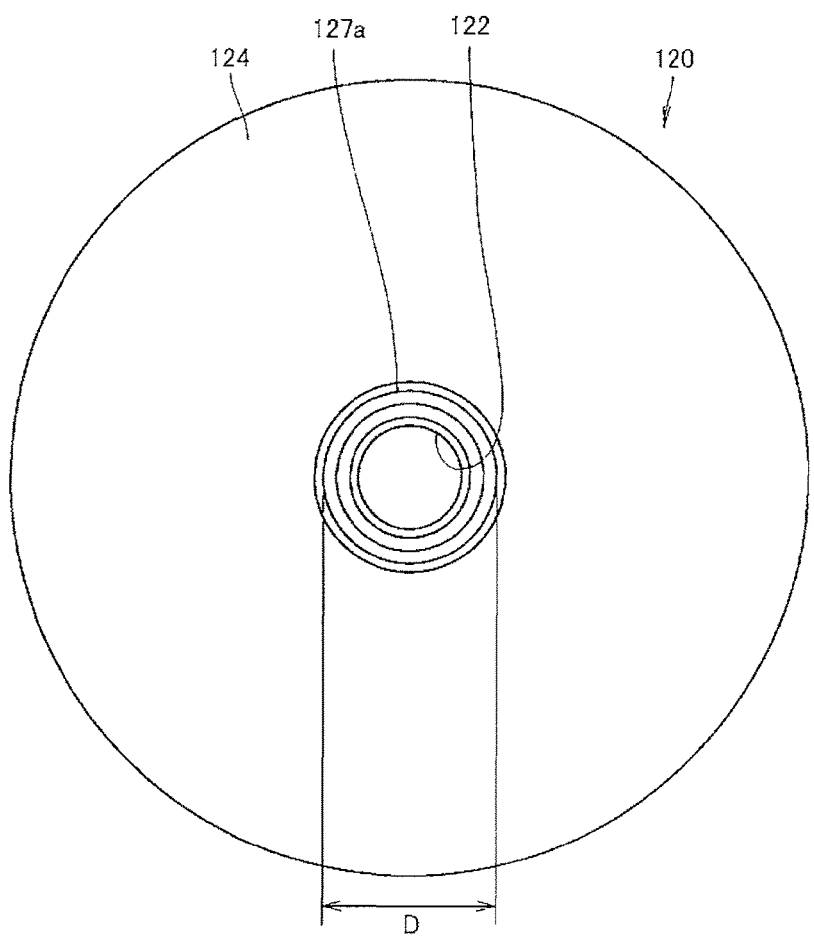

In addition, as shown in FIG. 4, on a rotating disk 120a, a protrusion 127a may be formed, instead of the protrusion 127. The protrusion 127a has a brim, over the whole circumferential direction, which extends in a direction along the diameter of the inverse conically shaped body 121 and is thin-flat-plate-like. Between an upper surface of the protrusion 127a and the inverse conically shaped body, a space is formed, and on the upper surface of the protrusion 127a, a horizontal part is formed. The protrusion 127a is also positioned above the surface of the liquid 300. An outer diameter D of the protrusion 127a is smaller than the inner diameter of the opening part 112 on the side on which the rotating disk 120 of the U-shaped vessel 110 is positioned.

As described above, it is only required for the protrusion formed on the outer peripheral surface of the inverse conically shaped body 121 of the rotating disk to protrude in the whole circumferential direction of the inverse conically shaped body 121 in the direction along the diameter of the inverse conically shaped body 121, and the protrusion may have a shape other than the shapes of the protrusions 127 and 127a.

Hereinafter, a method for pumping up and transporting the liquid 300 by the liquid transport apparatus 1 configured as described above will be described.

A user of the liquid transport apparatus 1 first, if necessary, controls the heating and heat-retaining part 170 for heating the U-shaped vessel 110 and the liquid reservoir tank 210 and adjusts a temperature of the liquid 300 inside the U-shaped vessel 110 and the liquid reservoir tank 210 to a predetermined temperature. It is to be noted that temperatures of the liquid 300 inside the U-shaped vessel 110 and the liquid 300 inside the liquid reservoir tank 210 may be different from each other.

Next, when the rotating disk driving motor part 130 is driven and the rotating disk 120 is rotated, the liquid 300 rises from the lower end of the rotating disk 120 along a slope, passing along an upper surface of the slope of the inverse conically shaped body 121. The rotating disk 120 is rotated, for example, at 300 to 2000 rpm. The liquid 300 is going to rise, also passing along a lower surface of the slope of the inverse conically shaped body 121. However, since on the lower surface of the slope of the inverse conically shaped body 121, the protrusion 127 is formed, when the liquid 300 has reached a height at which the protrusion 127 is formed, the liquid 300 is transported toward a horizontal direction. This prevents the liquid 300 from passing along the lower surface of the upper brim part 124 and thereby leaking out into the apparatus or the like, thereby allowing the liquid 300 to be returned to the inside of the U-shaped vessel 110.

The liquid 300 which has risen up to the upper end of the upper surface of the slope of the inverse conically shaped body 121 subsequently moves from the center of the upper surface of the upper brim part 124 toward an outside thereof. The liquid 300 which has moved up to a peripheral edge portion of the upper brim part 124 is scattered by centrifugal force from the peripheral edge portion of the upper brim part 124 toward an outer direction. The scattered liquid 300 collides with the collecting wall 150 or is directly transported into, for example, a collecting vessel without colliding with the collecting wall 150.

It is preferable that the liquid 300 is continuously supplied into the U-shaped vessel 110. The liquid 300 is supplied from the supply part 160 into the liquid reservoir tank 210. The circulation pump 202 is driven by the circulation motor 203, whereby the liquid 300 in the liquid reservoir tank 210 is sucked up from the liquid suction port 206, passes through the liquid circuit passage 201, and is supplied from the opening part 113 of the U-shaped vessel 110 into the U-shaped vessel 110. When an amount of the liquid 300 in the liquid reservoir tank 210 decreases, user supplies the liquid 300 from the supply part 160 into the liquid reservoir tank 210.

The liquid 300 supplied into the U-shaped vessel 110 passes through an inside of the U-shaped vessel 110 and moves toward an opposite end portion of the U-shaped vessel 110, that is, the opening part 112 on which the rotating disk 120 is positioned. When a liquid level in the U-shaped vessel 110 reaches a height of the overflow opening part 111, the liquid 300 overflows from the overflow opening part 111 and the liquid 300 flows down into the liquid reservoir tank 210. If the liquid overflows from a place other than the overflow opening part 111, the liquid passes along the rectifier 205, thereby returning into the liquid reservoir tank 210.

In the above description, the specific example of the method in which the level of the liquid 300 supplied into the U-shaped vessel 110 is kept constant and further, the height of the rotating disk 120 is adjusted, thereby keeping constant the distance between the opening part 122 of the lower end of the rotating disk 120 and the liquid surface is described On the other hand, there may be a method for keeping constant the distance between the opening part 122 of the lower end of the rotating disk 120 and the liquid surface without having any means for keeping the liquid level constant, that is, a method in which the rotating disk 120 is caused to be descending in accordance with a rate at which the liquid level is being lowered by operating the rotating disk 120 and thereby transporting the liquid 300. In this method, although the mechanism of the apparatus for keeping the liquid level constant becomes unnecessary, a mechanism for continuously and accurately measuring the rate at which the liquid 300 is transported by the rotating disk 120 and for causing the rotating disk 120 to descend in accordance with that rate is required.

As described above, the level of the liquid 300 in the U-shaped vessel 110 can be kept constant by supplying the liquid 300 continuously such that the liquid 300 overflows from the overflow opening part 111 of the opening part 113 of the U-shaped vessel 110. In the case where the level of the surface of the liquid 300 is kept constant as described above, it is preferable that a level of the rotating disk 120 is kept constant.

As described above, the liquid transport apparatus 1 includes: the U-shaped vessel 110 for storing the liquid 300; the hollow inverse conically shaped body 121 which has the opening part 123 of the upper end and the opening part 122 of the lower end; and the rotating disk driving motor part 130 which rotates the inverse conically shaped body 121 on the axis extending along the substantially vertical direction. The opening part 122 of the lower end of the inverse conically shaped body 121 is immersed in the liquid 300 stored in the U-shaped vessel 110.

In addition, in the liquid transport apparatus 1, as liquid level adjusting means of one example of the means for adjusting the distance between the opening part 122 of the lower end of the inverse conically shaped body 121 and the surface of the liquid 300 stored in the vessel, the overflow opening part 111 is formed in one part of the opening part 113 of the U-shaped vessel 110. The overflow opening part 111 is a discharging outlet for the liquid 300, which is formed in the U-shaped vessel 110 to discharge an amount of the liquid 300 which exceeds an amount allowing the level of the liquid 300 stored inside the U-shaped vessel 110 to be at the predetermined height. The overflow opening part 111 is formed in the U-shaped vessel 110 and the liquid level in the U-shaped vessel 110 is kept constant, thereby keeping constant the distance between the opening part 122 of the lower end of the inverse conically shaped body 121 and the surface of the liquid 300 stored in the U-shaped vessel 110.

In addition, in the liquid transport apparatus 1, the liquid level adjusting means as one example of the distance adjusting means includes: the liquid reservoir tank 210 for storing the liquid 300 which passes through the opening part 113 of the U-shaped vessel 110 and is discharged from the inside of the U-shaped vessel 110; and at least the liquid circuit 200 for returning the liquid 300 in the liquid reservoir tank 210 to the U-shaped vessel 110.

In addition, the liquid transport apparatus 1 includes the elevator mechanism 140 including the slide rail 141 as one example of the distance adjusting means for adjusting the relative height of the inverse conically shaped body 121 with respect to the surface of the liquid 300 stored in the U-shaped vessel 110 so as to allow the distance between the opening part 122 of the lower end of the inverse conically shaped body 121 and the surface of the liquid 300 stored in the U-shaped vessel 110 to be kept constant.

In addition, the liquid transport apparatus 1 includes the heating and heat-retaining part 170 for heating the liquid 300 stored in the U-shaped vessel 110. Thus, it is made possible to control a temperature of the liquid while the liquid having a temperature higher than a room temperature is pumped up and transported by the liquid transport apparatus 1.

By employing the above-described configuration, the liquid transport apparatus 1 which utilizes the centrifugal force generated in the liquid through the rotation of the inverse conically shaped body, has the simple configuration, and is capable of pumping up and transporting the liquid at a constant rate, can be provided.

It is only required for the liquid 300 to be capable of being transported by using the liquid transport apparatus 1, and a kind, composition, a melting point, and the like thereof are not limited. Depending on a liquid to be transported, materials of the members constituting the liquid transport apparatus 1 may be selected.

In addition, a source of the liquid 300 in a solid state may be supplied to the liquid reservoir tank 210 and be liquefied in the liquid reservoir tank 210, and the liquid 300 may be additionally supplied into the U-shaped vessel 110 in accordance with a decrease in the amount of the liquid 300 inside the U-shaped vessel 110. The supply of the liquid 300 from the liquid reservoir tank 210 to the U-shaped vessel 110 may be conducted continuously as described above or intermittently.

(Second Embodiment)

A liquid transport apparatus according to a second embodiment is used as an apparatus for transporting molten salt as a liquid. In this embodiment, an apparatus for manufacturing metal fine particles including a molten salt transport apparatus will be described. Members denoted with the same reference numerals as in the first embodiment are configured in the same manner as in the first embodiment.

Figure 5:
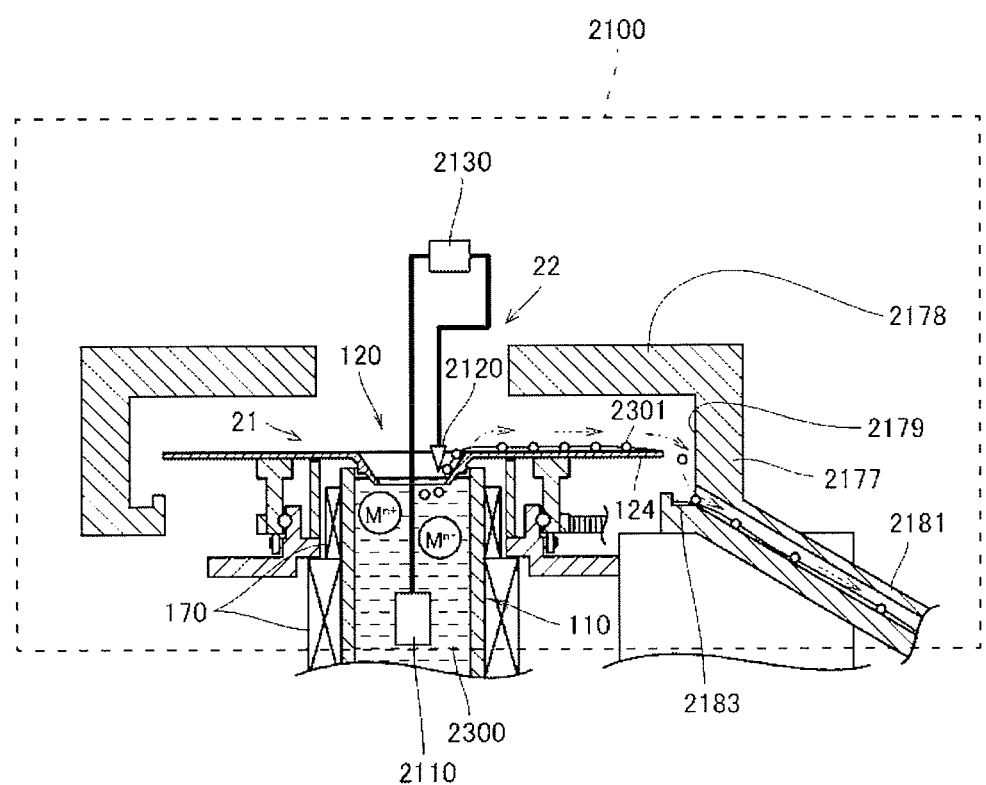
FIG. 5 is a diagram partially and schematically illustrating an electrolytic generator to produce metal fine particles of an apparatus for manufacturing metal fine particles including the liquid transport apparatus as the one embodiment of the present invention.

As shown in FIG. 5, an apparatus for manufacturing metal fine particles according to the second embodiment is an apparatus for manufacturing metal fine particles by using, as an electrolytic bath, molten salt 2300 as one example of the liquid and by employing a plasma-induced electrolysis method.

An electrolytic generator 2100 to produce metal fine particles is filled with an inert gas, is constituted of a molten salt transporter 21 and an electrolysis part 22, and collects metal fine particles 2301 formed in the molten salt 2300 together with the molten salt by the molten salt transporter 21 to an outside of the apparatus. The inert gas is, for example, argon.

The molten salt transporter 21 is constituted of: a U-shaped vessel 110 for storing the molten salt 2300; a heating and heat-retaining part 170 including a heater for heating and heat-retaining the U-shaped vessel 110 and a heat insulating material; a rotating disk 120 for pumping up and transporting the molten salt 2300 inside the U-shaped vessel 110 to an outside of the U-shaped vessel 110; a rotating disk driving motor part 130 (refer to FIG. 2) for driving the rotating disk 120; an elevator mechanism 140 (refer to FIG. 2) for the rotating disk 120; and a collecting wall part 2177.

The electrolysis part 22 is constituted of: an anode 2110 installed inside the U-shaped vessel 110 for storing the molten salt; a cathode 2120 positioned above a surface of the molten salt bath; and a power source 2130 for applying a voltage between the anode 2110 and the cathode 2120.

A tip of the cathode 2120 is positioned above an opening part 122 of a lower end (refer to FIG. 2) of the rotating disk 120, that is, an inverse conically shaped body 121 (refer to FIG. 2) formed to be of an inverse conical shape and above the surface of the bath so as not to contact the molten salt 2300.

The configuration of a molten salt preparation part is the same as that of the liquid circuit 200 (refer to FIG. 1) in the first embodiment. However, in order to allow stable use under coexistence of the molten salt having a high temperature, it is preferable that as a structural material of the reservoir tank, the pump, and the like, ceramics such as high purity alumina, stainless steel, Ni, or a Ni base alloy such as inconel is selected. In addition, in order to prevent contamination of moisture into the molten salt and deterioration in the above-mentioned structural material, it is preferable that an inside of the preparation part is under an atmosphere of an inert gas such as Ar and nitrogen.

As the molten salt 2300 used in the plasma-induced electrolysis, a bath used generally in molten salt electrolysis can be used. For example, it is preferable that molten salt selected from an alkali metal halide, an alkaline earth metal halide, an alkali metal carbonate, an alkaline earth metal carbonate, alkali metal sulfate, alkaline earth metal sulfate, alkali metal nitrate, alkaline earth metal nitrate, or the like is used as a solvent of the electrolytic bath alone or in combination of two or more kinds of the above-mentioned substances.

As an alkali metal halide, LiF, NaF, KF, RbF, CsF, LiCl, NaCl, KCl, RbCl, CsCl, LiBr, NaBr, KBr, RbBr, CsBr, LiI, NaI, KI, RbI, CsI, or the like can be used. As an alkaline earth metal halide $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, $BaI_2$, or the like can be used. Each of the above-mentioned compounds can be used alone or in combination of two or more kinds of the above-mentioned substances. Combinations of these substances, the number of combined substances, a mixture ratio, and the like are not limited and can be arbitrarily selected in consideration of a component, a kind and the like of desired metal fine particles.

A metal compound or the like to be a raw material of the metal fine particles is dissolved to supplying metal ions $M^{n+}$ into the molten salt as mentioned above, the plasma-induced electrolysis is conducted, thereby allowing the metal fine particles of M to be formed in the molten salt 2300.

As the anode 2110, an electrode generally used as an anode in the molten salt electrolysis can be used, and the anode 2110 is not particularly limited. For example, a carbon material such as vitreous carbon, graphite, electrically conductive diamond can be used as the electrode. In a case where the anode 2110 contains or is caused to contact the metal to be the raw material of the metal fine particles, anodic dissolution reaction of the metal M proceeds and the metal ions $M^{n+}$ are supplied to the molten salt. Therefore, it is preferable that the anode 2110 contains or is caused to contact the metal to be the raw material of the metal fine particles. In this case, the addition of the raw material such as the metal compound to the molten salt 2300 is optional.

The rotating disk 120 is configured as in the first embodiment. The inverse conically shaped body 121 of the rotating disk 120 is an electrical insulator at least in a surface thereof and is formed by high purity alumina as one example.

A peripheral edge of the upper brim part 124 of the rotating disk 120 is covered by the collecting wall part 2177. The wall part 2177, 2178 covers the outside of the peripheral edge of the upper brim part 124. In a lower portion of an internal surface 2179 in the wall part 2177, the later-described collecting groove 2183 is formed, and in the collecting groove 2183, an opening is formed. Inside the wall part 2177, a metal fine particle collecting path 2181 for communicating with an outside of the wall part 2177 through the opening in the collecting groove 2183 is formed. An opening formed in the other end portion of the metal fine particle collecting path 2181 is opened to a metal fine particle collecting vessel (not shown) positioned in a position lower than the opening of the wall part 2177.

The other configuration and effects of the molten salt transporter 21 in the electrolytic generator 2100 of the apparatus for manufacturing metal fine particles are the same as those in the liquid transport apparatus 1 according to the first embodiment.

Hereinafter, a method in which by using the apparatus for manufacturing metal fine particles configured as described above to transport the metal fine particles produced by employing the plasma-induced electrolysis method in the molten salt will be described.

A user of the apparatus for manufacturing metal fine particles first controls the heating and heat-retaining part 170 for heating and heat-retaining the U-shaped vessel 110 and an electric furnace (not shown) for heating the liquid reservoir tank 210 (FIG. 1) for storing the molten salt, thereby adjusting a temperature of the molten salt 2300 inside the U-shaped vessel 110 and the molten salt reservoir tank 210 to a predetermined temperature. Further, a user fills the electrolytic generator 2100 with an argon gas.

Next, the metal compound or the like to be the raw material of the metal fine particles is dissolved, or the anode 2110 which contains or is caused to contact the metal to be the raw material of the metal fine particles is installed.

When an appropriate voltage is applied between the anode 2110 and the cathode 2120 by the power source 2130, the argon gas is ionized, thereby causing electrical discharge between the cathode 2120 and the surface of the molten salt 2300. The metal ions $M^{n+}$ in the molten salt are reduced by electrons emitted from the cathode and the metal fine particles of M are formed in the vicinity of the surface of the molten salt bath. The inverse conically shaped body 121 can safely and stably conduct cathodic discharging in the vicinity of the inverse conically shaped body 121 since at least the surface thereof is formed of the insulator.

When the rotating disk driving motor part 130 is driven and the rotating disk 120 is rotated, the molten salt 2300 including the generated metal fine particles 2301 rises from the lower end of the rotating disk 120 along a slope, passing along the slope of the inverse conically shaped body 121. The rotating disk 120 is rotated, for example, at 100 to 1000 rpm. The molten salt 2300 including the metal fine particles 2301 rises by centrifugal force from a lower end of an inner surface of the inverse conically shaped body 121 up to an upper end thereof. As described above, the metal fine particles formed just under the discharging are quickly transported from under the discharging to an outside. In the case, since the molten salt can be transported at any constant rate in accordance with a depth at which the rotating disk 120 is immersed and the rotational frequency, it is effective to control the growth of the metal fine particles. In addition, since the protrusion 127 is formed on the outer surface of the slope of the inverse conically shaped body 121, the molten salt 2300 including the metal fine particles 2301 rises only up to a height of the protrusion 127 from the lower end outside of the inverse conically shaped body 121. Through the function of this protrusion 127, the molten salt in an area in which the metal fine particles are not formed is not transported, thereby reducing an amount of molten salt transported.

The molten salt 2300 including the metal fine particles 2301 which has risen up to the upper end of the inverse conically shaped body 121 subsequently moves from the center of the upper surface of the upper brim part 124 toward an outside thereof, as indicated by an arrow of a two-dot chain line in FIG. 5. The molten salt 2300 including the metal fine particles 2301 which has moved up to a peripheral edge portion of the upper brim part 124 is scattered by centrifugal force from the peripheral edge portion of the upper brim part 124 in a direction outside of the upper brim part 124. The scattered molten salt 2300 including the metal fine particles 2301 collides with the wall part 2177 or directly falls into the collecting groove 2183 without colliding with the wall part 2177.

The molten salt 2300 including the metal fine particles 2301 which has fallen into the collecting groove 2183 flows in the metal fine particle collecting path 2181 and is collected into the metal fine particle retrieving vessel (not shown).

As described above, the apparatus for manufacturing metal fine particles including the molten salt transport apparatus includes: the U-shaped vessel 110 for storing the molten salt 2300; the inverse conically shaped body 121 which has the opening part 123 of the upper end and the opening part 122 of the lower end and is hollow; and the rotating disk driving motor part 130 which rotates the inverse conically shaped body 121 on the axis extending along the substantially vertical direction. Stored in the U-shaped vessel 110 is the molten salt 2300. The opening part 122 of the lower end of the inverse conically shaped body 121 is immersed in the molten salt 2300 stored in the U-shaped vessel 110.

In addition, in the apparatus for manufacturing metal fine particles, as one example of the liquid level adjusting means of one example of the distance adjusting means, the overflow opening part 111 is formed in the U-shaped vessel 110. As in the first embodiment, the overflow opening part 111 is a discharging outlet for the molten salt 2300, which is formed in the U-shaped vessel 110 to discharge an amount of the molten salt 2300 which exceeds an amount allowing the liquid level of the molten salt 2300 stored inside the U-shaped vessel 110 to be at the predetermined height. The overflow opening part 111 is formed in the U-shaped vessel 110 and the liquid level in the U-shaped vessel 110 is kept constant, thereby keeping constant the distance between the opening part 122 of the lower end of the inverse conically shaped body 121 and the surface of the molten salt 2300 stored in the U-shaped vessel 110.

In addition, the above-described liquid level adjusting means includes: a molten salt reservoir tank 210 for storing the molten salt 2300 passing along the overflow opening part 111 of the U-shaped vessel 110 then drained from the U-shaped vessel 110; and a liquid circulation means for returning the molten salt 2300 inside the molten salt reservoir tank 2210 to the U-shaped vessel 110. The liquid circulation means is the same as that in the first embodiment.

In addition, the apparatus for manufacturing metal fine particles including the molten salt transport apparatus includes; the heating and heat-retaining part 170 for heating the molten salt 2300 stored in the U-shaped vessel 110 and the electric furnace (not shown). Thus, it is made possible to keep the molten salt having a melting point higher than a room temperature in a liquid state while the metal fine particles are generated and collected.

EXAMPLES

Example 1

It was confirmed that the liquid can be pumped up and transported at a constant rate by the liquid transport apparatus according to the present invention, as described below. As the liquid, water was used.

By using the liquid transport apparatus 1 configured as shown in FIG. 1, the below-described experiment was conducted.

The water was supplied at a constant rate (1.7 L/min) from the opening part on the side on which the overflow opening part 111 of the U-shaped vessel 110 was formed and the water was overflowed from the overflow opening part 111, thereby allowing a position of a liquid surface to be kept. On the other hand, the rotating disk 120 was configured to be rotated by a driving gear part 131 directly connected to the rotating disk driving motor part 130 via the rotation gear part 126 provided on the outer peripheral portion of the supporting part 125 of the rotating disk 120, was fixed on a base including the elevator mechanism 140, and was set so as to control independently the rotational frequency of the rotating disk 120 and a distance between a lower surface of the rotating disk 120 and a liquid surface.

With respect to the water which had risen from the lower end up to the upper end of the inverse conically shaped body 121 of the rotating disk 120 and had been transported in an outer circumferential direction of the upper brim part 124, a transport rate was obtained through the collection of the water by utilizing the cylindrical collecting wall 150 installed outside of the rotating disk 120.

By using the liquid transport apparatus 1, a relationship among the rotational frequency of the rotating disk 120, a depth in which the lower end of the inverse conically shaped body 121 was immersed in the water, an inclination angle between the slope of the inverse conically shaped body 121 and a horizontal plane, a diameter of the opening part 122 of the lower end of the inverse conically shaped body 121, and the rate at which the water was transported from the rotating disk 120 was examined.

Figure 6:
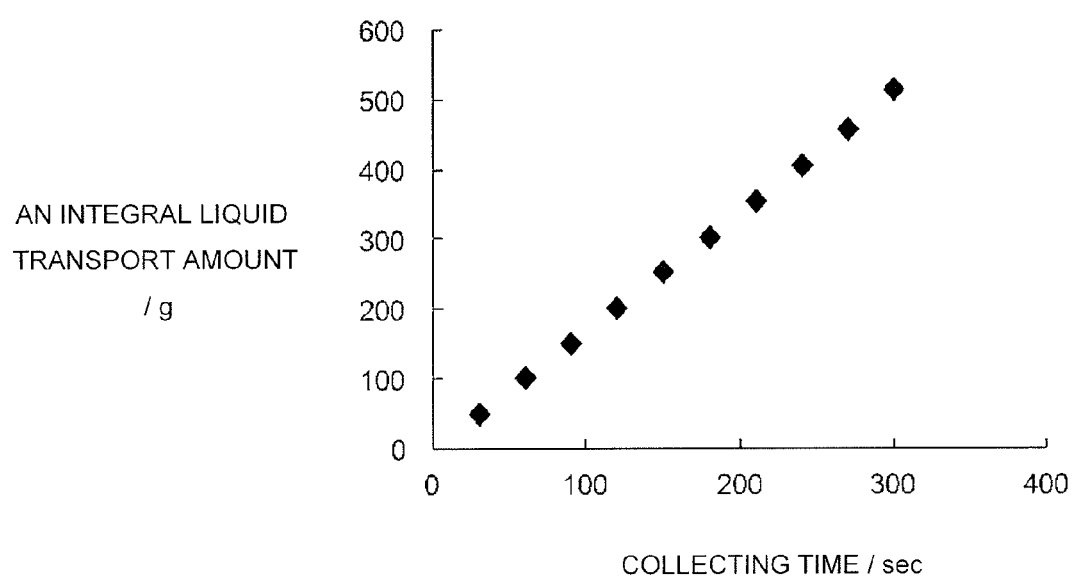
FIG. 6 is a graph showing a relationship between a period of time and an integrated transport amount of a liquid (water) obtained when a depth in which a lower end of an inverse conically shaped body is immersed and the rotational frequency are constant.

FIG. 6 is a graph showing a change in an integrated transport amount of the water obtained when the rotational frequency of the rotating disk 120 was 500 rpm; the inclination angle between the slope of the inverse conically shaped body 121 and the horizontal plane was 50°; the diameter of the opening part 122 of the lower end of the inverse conically shaped body 121 was 40 mm; and with respect to a surface of the water which was in a still state, the depth in which the lower end of the inverse conically shaped body 121 was immersed in the water 300 inside the U-shaped vessel 110 was 1.5 mm.

As shown in FIG. 6, it was confirmed that the integrated transport amount of the water increased at a constant rate, the position of the liquid surface was kept stable and further, the position of the lower end of the inverse conically shaped body 121 was kept constant, thereby allowing the transport rate of the liquid to be kept stable.

Figure 7:
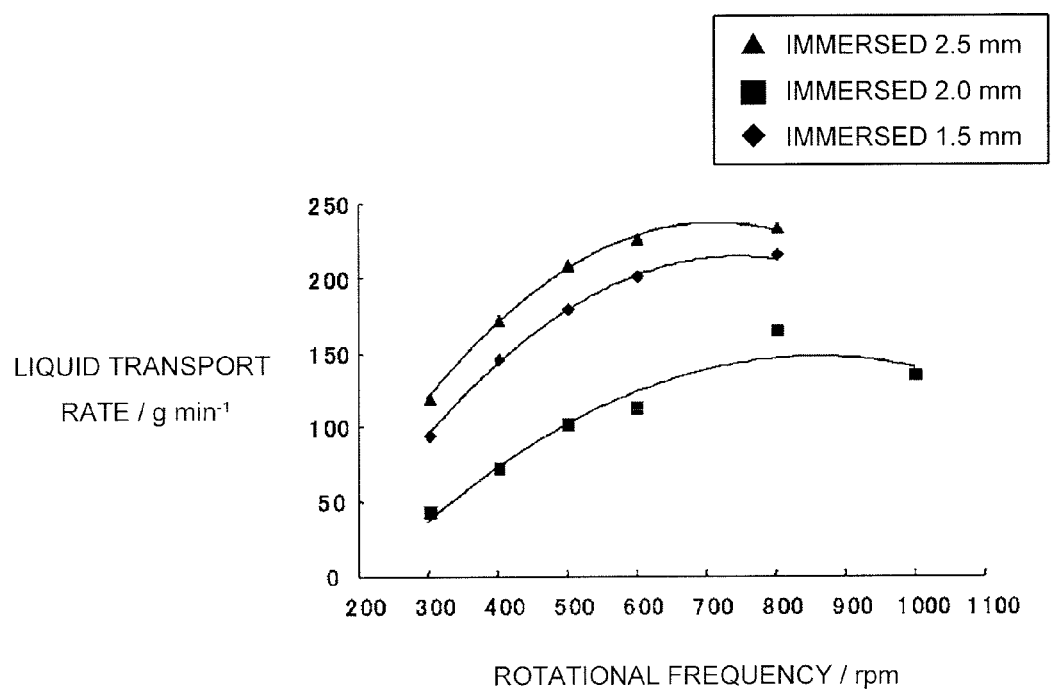
FIG. 7 is a graph showing a relationship among the depth in which the lower end of the inverse conically shaped body is immersed, the rotational frequency, and a transport rate of the liquid (water).

FIG. 7 is a graph showing a relationship between the depth in which the rotating disk 120 was immersed (with reference to the surface of the bath under the operation of the pump) and the transport rate of the water. The inclination angle between the slope of the inverse conically shaped body 121 and the horizontal plane was 50° and the diameter of the opening part 122 of the lower end of the inverse conically shaped body 121 was 40 mm.

As shown in FIG. 7, it was able to be confirmed that the depth in which the lower end of the inverse conically shaped body 121 was immersed increased, whereby the transport rate increased with the same rotational frequency. It was confirmed that the immersion depth increased and a contacting area for transmitting the rotation of the rotating disk 120 to the water increased, whereby the transport rate increased and in addition, that the rotational frequency of the rotating disk 120 increased, whereby the transport velocity of the water increased. When the rotational frequency increases, the rate of the water in a rotating direction also increases and the centrifugal force is enhanced, thereby increasing the transport rate. It is considered that because the rotation of the rotating disk 120 is not sufficiently transmitted to the water if rotational frequency is large, the change in the transport rate becomes moderate.

From the above-described result, it was confirmed that by the depth in which the inverse conically shaped body 121 of the rotating disk 120 was immersed and the rotational frequency, the transport rate of the liquid can be controlled.

Figure 8:
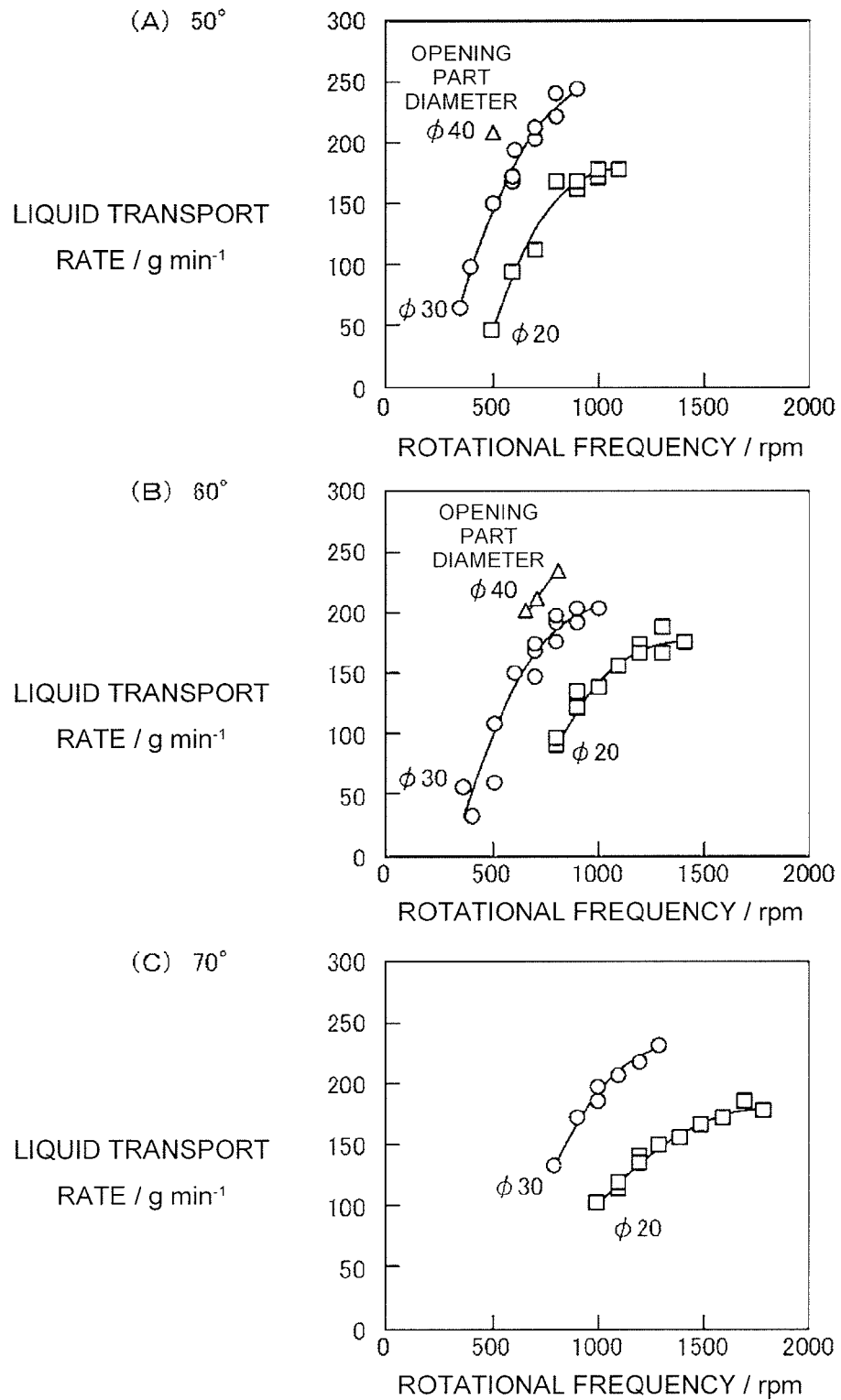
FIG. 8 shows graphs each showing a relationship among an inclination angle between an inner peripheral surface of the inverse conically shaped body and a horizontal plane, a diameter of the inverse conically shaped body, the rotational frequency, and the transport rate of the liquid (water) obtained when the depth in which the lower end of the inverse conically shaped body is immersed is constant.

FIG. 8 shows graphs each showing a relationship among the inclination angle between the slope of the inverse conically shaped body 121 and the horizontal plane, the diameter of the opening part of the lower end of the inverse conically shaped body 121, and the transport rate of the water, obtained when the depth in which the inverse conically shaped body 121 of the rotating disk 120 was immersed in the water 300 inside the U-shaped vessel 110 was fixed to 2.5 mm.

As shown in FIG. 8, it was confirmed that the smaller the inclination angle of the slope was and the larger the diameter of the opening part 122 of the lower end of the inverse conically shaped body 121 was, the larger an increase in the transport rate with the same rotational frequency was. This means the transport rate increases since the larger the diameter of the opening part 122 is, the larger the distance to the center of the rotation is, thereby enhancing the centrifugal force, and the smaller the inclination angle of the slope is, the larger an increase in a component of force of the centrifugal force exerted upwardly on the slope becomes.

From the above-described result, it was confirmed that by the inclination angle of the slope of the rotating disk 120, the diameter of the opening part 122 of the lower end of the rotating disk 120, and the rotational frequency, the transport rate of the liquid can be controlled.

Example 2

It was confirmed that by the liquid transport apparatus according to the present invention, a liquid was able to be pumped up and transported at a constant rate, by using molten salt as the liquid as described below. By using the liquid transport apparatus 1 configured as shown in FIG. 1 as the liquid transport apparatus, as in Example 1, an experiment was conducted. As the molten salt, LiCl—KCl which is of eutectic composition was used, and a bath temperature was 450° C.

Figure 9:
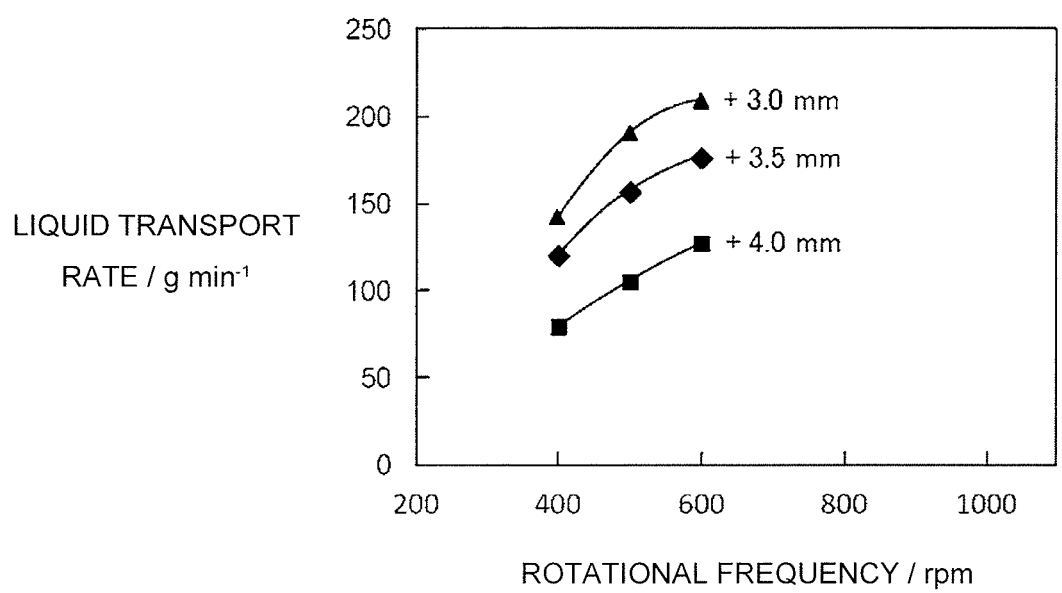
FIG. 9 is a graph showing a relationship among the depth in which the lower end of the inverse conically shaped body is immersed, the rotational frequency, and a transport rate of a liquid (molten salt).

FIG. 9 is a graph showing a relationship between a depth in which the rotating disk 120 is immersed (with reference to the surface of the bath with the pump being stopped) and a transport rate of the molten salt. An inclination angle between the slope of the inverse conically shaped body 121 and the horizontal plane was 50°, and a diameter of the opening part 122 of the lower end of the inverse conically shaped body 121 was 40 mm.

As shown in FIG. 9, it was able to be confirmed that the depth in which the lower end of the inverse conically shaped body 121 was immersed increased, whereby the transport rate of the molten salt with the same rotational frequency increased. In addition, it was confirmed that the rotational frequency of the rotating disk 120 increased, whereby the transport rate of the molten salt increased.

From the above-described result, as in the case of the water in Example 1, it was confirmed that by the depth in which the inverse conically shaped body 121 of the rotating disk 120 is immersed and the rotational frequency, the transport rate of the molten salt can be controlled.

The described embodiments and examples are to be considered in all respects only as illustrative and not restrictive. It is intended that the scope of the invention is, therefore, indicated by the appended claims rather than the foregoing description of the embodiments and examples and that all modifications and variations coming within the meaning and equivalency range of the appended claims are embraced within their scope.

REFERENCE SIGNS LIST

1: liquid transport apparatus, 110: U-shaped vessel, 111: overflow opening part, 121: inverse conically shaped body, 122: lower end opening part, 123: upper end opening part, 124: upper brim part, 127, 127a: protrusion, 130: rotating disk driving motor part, 140: elevator mechanism, 170: heating and heat-retaining part, 200: liquid circuit, 210: liquid reservoir tank, 300: liquid, 2120: cathode, 2300: molten salt.

The invention claimed is:

1. A liquid transport apparatus comprising:
   a U-shaped vessel having two ends for storing a liquid;
   an inverse conically shaped body being hollow and having an opening part on an upper end and an opening part on a lower end of the inverse conically shaped body;
   a cathode being positioned above the liquid in the vicinity of a surface of the liquid stored in the vessel and around the opening part of the lower end of the inverse conically shaped body; and
   a driving source for rotating the inverse conically shaped body on an axis extending along a substantially vertical direction,
   wherein the liquid stored in the vessel is molten salt,
   the opening part of the lower end of the inverse conically shaped body being positioned so as to be immersed in the liquid stored in the vessel, the liquid transport apparatus further comprising
   a distance adjuster for keeping constant a distance between the opening part on the lower end of the inverse conically shaped body and a surface of the liquid stored in the vessel,
   the distance adjuster including a liquid level adjuster for keeping a level of the liquid stored in the vessel such that the distance between the opening part on the lower end of the inverse conically shaped body and the surface of the liquid stored in the vessel is kept constant,
   the liquid level adjuster including: a liquid reservoir tank for storing the liquid passing through an opening part of the vessel and drained from an inside of the vessel, and a liquid circulator for returning the liquid inside the liquid reservoir tank to the vessel,
   wherein the one end of the U-shaped vessel has an opening part and the opening part is positioned below the inverse conically shaped body and the other end of the U-shaped vessel has an overflow opening part and the overflow opening part is opened above the liquid reservoir tank in the vicinity of the liquid reservoir tank; and
   wherein on an outer peripheral surface of the inverse conically shaped body and below the upper end of the inverse conically shaped body, a protrusion extending along a direction of a diameter of the inverse conically shaped body is formed and the protrusion is positioned above the surface of the liquid stored in the vessel.

2. The liquid transport apparatus according to claim 1, wherein the liquid level adjuster includes a draining outlet formed in the vessel to drain an amount of the liquid which exceeds an amount allowing the level of the liquid stored inside the vessel to be at a predetermined height.

3. The liquid transport apparatus according to claim 1, wherein the distance adjuster includes a height adjuster for adjusting a relative position of the inverse conically shaped body with respect to the surface of the liquid stored in the vessel so as to allow the distance between the opening part of the lower end of the inverse conically shaped body and the surface of the liquid stored in the vessel to be kept constant.

4. The liquid transport apparatus according to claim 1, comprising a heating part for heating the liquid stored in the vessel.

5. The liquid transport apparatus according to claim 1, wherein the inverse conically shaped body includes a lower side brim part extending from the opening part of the lower end toward an inside of the inverse conically shaped body in a substantially horizontal direction.

* * * * *